July 20, 1965     H. LINDEMANN     3,195,336
CLAMPING AND STRAIGHTENING DEVICES
Filed Sept. 28, 1961     2 Sheets-Sheet 2

INVENTOR
HANS LINDEMANN
BY Dicke and Craig
ATTORNEYS 3,195,336
CLAMPING AND STRAIGHTENING DEVICES
Hans Lindemann, Bielefield, Germany, assignor to
Th. Calow & Co., Bielefield, Germany
Filed Sept. 28, 1961, Ser. No. 141,529
Claims priority, application Germany, Sept. 29, 1960,
C 22,436
16 Claims. (Cl. 72—72)

The present invention relates to improvements in clamping and straightening devices for bar scalping or skimming machines and in apparatus which are associated with such devices for operating the same. More particularly, the invention is used in connection with a scalping or skimming machine which essentially comprises a revolving cutter head for scalping a workpiece, such as a wire, pipe, bar, or the like, a feeding mechanism in front of said cutter head, for example, a reciprocating clamping carriage or power-driven feed rollers, for feeding the workpiece continuously toward and through the machine, and at least one reciprocating clamping carriage behind the cutter head which is controlled, for example, by limit switches and is equipped with means for clamping the scalped workpiece to prevent it from being turned about its axis by the action of the cutter head.

The known machines of this type are also frequently equipped with apparatus for polishing and/or straightening the scalped workpiece immediately after emerging from the machine. Such machines including their feeding, clamping, and other associated apparatus have a very great length and are also very expensive which is especially due to the fact that the rear clamping carriage behind the scalping machine, as seen in the direction of movement of the workpiece, and, if provided, the front clamping carriage as well have to travel for considerable distances and that the additional apparatus such as the polishing and straightening means, also have a considerable length.

It is the principal object of the present invention to overcome this disadvantage of the conventional scalping machines and to reduce considerably the total length of such a machine including its associated apparatus.

According to the invention, this object is attained by providing the rear clamping carriage in the form of two sections which are positively connected to each other but are adapted to carry out reciprocating movements relative to each other, by providing each carriage section with at least two clamping jaws which are movable relative to each other, and by further providing one of the carriage sections with one or more mechanisms for polishing, calibrating, or reducing, or straightening the workpiece. Although the particular means for positively connecting the two sections of the rear clamping carriage to each other may be of various designs, it is advisable to connect them by means of hydraulic pistons which are movable in cylinders in one carriage part and may be driven in both directions, while the piston rods are secured to the other carriage part.

Another object of the invention is to design the machine in such a manner that the mechanism for polishing or calibrating the scalped workpiece will be in operation as long as the clamping jaws which are mounted on the same carriage section as this mechanism are opened and released from the workpiece, while the clamping jaws on the other carriage section grip the workpiece so that both carriage sections are then taken along by the continuous forward movement of the workpiece. A further object of the invention is to improve the effect of the polishing or calibrating mechanism by providing suitable control means which permit the carriage section which supports this mechanism to be repeatedly reciprocated relative to the workpiece during the time when the clamping jaws of the other carriage section grip the workpiece and when at least this carriage section is taken along by the workpiece.

A further object of the invention is to provide suitable control means for operating the straightening mechanism during the time when the clamping jaws which are mounted on the same carriage section as this mechanism grip the workpiece so that no relative movements occur between the workpiece and the straightening mechanism. The straightening mechanism preferably consists of a straightening press which is mounted on the mentioned carriage section between two or more workpiece supports and is provided with a plurality of press dies which are disposed within a plane extending vertically to the direction of movement of the workpiece and are adapted to act consecutively upon the workpiece. The straightening mechanism may, however, also be of any other suitable type and may consist, for example, of a straightening roller which revolves around the workpiece, the workpiece supports which are associated with the straightening mechanism should be adjustable relative to each other and each support is provided with one or more guiding means in the form of rollers or gliding surfaces which are adapted to engage with the workpiece and are also adjustable in radial directions relative to the workpiece. If these guiding means consist of gliding surfaces, they may be provided in the form of conventional collets or the like which are acted upon by a pressure medium, such as springs or a pneumatic or hydraulic medium and the inner diameter of which is changed when they are moved in their longitudinal direction, that is, in the direction of movement of the workpiece.

The control means according to the invention comprise a plurality of limit switches which insure a completely automatic operation of the machine. Thus, the two carriage sections should be provided or operatively associated with separate limit switches which are adapted to control the speed at which the two carriage sections are moved toward or away from each other and one of which serves for increasing and the other for decreasing this speed. Another limit switch should be provided on one of the two carriage sections for controlling the relative movement of the two carriage sections away from each other and for controlling the alternate actuation of the clamping means which are associated with the two carriage sections. Finally, one of the carriage sections may be provided with still another limit switch which will be depressed and actuated as soon as it engages with the end of the workpiece which has already been scalped, and which controls that the two carriage sections will not carry out any movements relative to each other prior to the time of such engagement.

The above-mentioned as well as other objects, features, and advantages of the present invention will become more clearly apparent from the following detailed description thereof which is to be read with reference to the accompanying diagrammatic drawings, in which—

FIGURE 2 shows a cross section taken along line A—A of FIGURE 1; while

Figure 1:
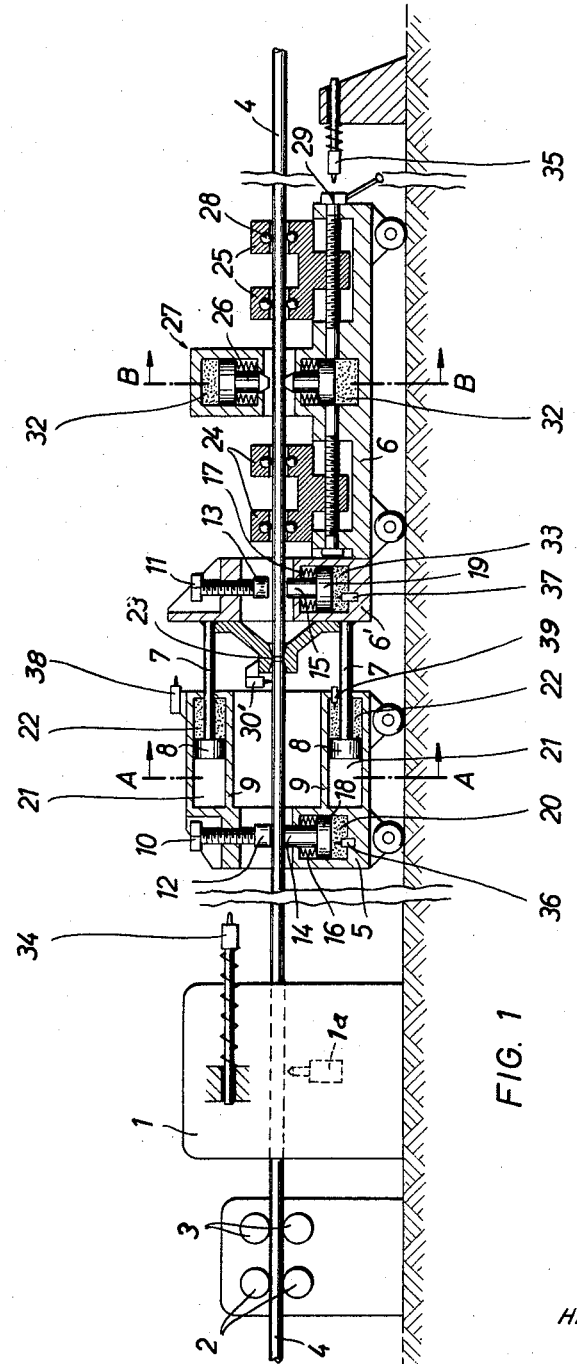
FIGURE 1 shows, partly in cross section, a side view of the scalping machine according to the invention.
Figure 2:
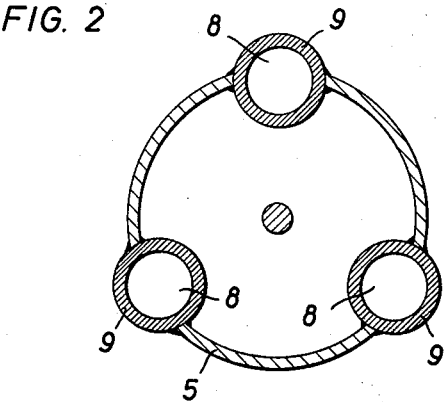

In the particular embodiment of the machine as illustrated in FIGURE 1, it is assumed that the scalping machine 1, which is not shown in detail since it is of a conventional type in which the scalping or skimming operation is carried out by a revolving cutter head shown diagrammatically in FIGURE 1 and designated by reference character 1a, is equipped with a feeding mechanism which consists of power-driven feed rollers 2 and 3 which are arranged in pairs opposite to each other in front of the scalping machine 1 and are adapted to feed the workpiece 4, for example, a long bar, continuously toward and through the scalping machine and to prevent the workpiece from turning about its axis during such movement.

Behind the scalping machine 1, as seen in the direction of movement of workpiece 4, a clamping carriage is provided which consists of two sections 5 and 6 which are positively connected to each other by suitable means. Although these connecting means may be of different designs, they preferably consist of hydraulic means, for example, as shown in FIGURE 1, of several piston rods 7 which are rigidly secured at one end to a part 6' of carriage section 6 which is preferably removably secured to the latter, while the pistons 8 on piston rods 7 are slidable in cylinders 9 which are mounted on the other carriage section 5. Each carriage section 5 and 6 is provided with clamping means which consist of a clamping jaw 12 or 13 which is adjustable by a threaded spindle 10 or 11, respectively, and an opposite clamping jaw 14 or 15 which is adapted to be reciprocated in a controlled movement relative to the jaw 12 or 13 and to the workpiece 4 between the jaws. Each clamping jaw 14 or 15 is acted upon by a spring 16 or 17, respectively, which is mounted in a cylinder and presses upon one side of a piston 18 or 19, thus tending to retract jaw 14 or 15 from the workpiece 4. For moving jaw 14 or 15 toward the workpiece 4 so as to grip it between the two jaws of each pair 12 and 14 or 13 and 15, a pneumatic or hydraulic medium is injected into the respective cylinder so as to apply a pressure upon the other side of piston 18 or 19. In FIGURE 1, the clamping jaws 12 and 14 are shown as being closed by the pressure medium in cylinder 20, while the other jaws 13 and 15 are opened.

The same pressure medium may also be alternately injected into chamber 21 or chamber 22 of cylinder 9 in order to move the two carriage sections 5 and 6 toward or away from each other.

The end portion 6' of carriage section 6 carries a calibrating tool 23 which is preferably exchangeable and consists of a nozzlelike member which is adapted to reduce the cross-sectional size of the scalped workpiece. In place of such a calibrating tool, it is also possible to provide a revolving mechanism for grinding, polishing, or burnishing the scalped workpiece.

Figure 3:
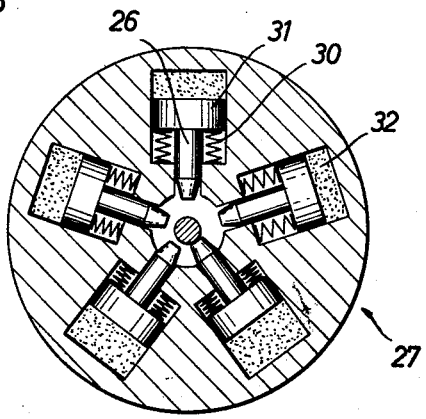
FIGURE 3 shows a cross section taken along line B—B of FIGURE 1.

The carriage section 6 is further provided with a straightening press 27 which contains several press dies 26 which are operated consecutively. This straightening press 27 is mounted on carriage section 6 between two pairs of rollers, each of which contains several rollers 28 which are adjustable in radial directions. Both pairs of supports are provided with inner screw threads of the same size but opposite pitch so as to be movable toward or away from each other by means of a spindle 29 with corresponding outer screw threads. Each press die 26 is acted upon by at least one spring 30 which tends to retract the die from the workpiece 4, and it may be moved in the opposite direction by the action of a pneumatic or hydraulic pressure medium upon the die piston 31. This pressure medium may come from the same source as that for acting upon the pistons 8, 18, and 19, but it is controlled in such a manner that the different dies 26 of the straightening press 27 will act consecutively upon the workpiece 4, as illustrated diagrammatically in FIGURE 3. Thus, while the cylinder 32 of one of the dies 26 is filled with the hydraulic medium but is not under pressure, the cylinder of the adjacent die is subjected to such a high pressure that this die will act upon the part of the workpiece which is held between the roller supports 24 and 25 to bend this part to its elastic limit. At the same time each following die, as seen in the clockwise direction, is moved successively toward the workpiece and engages the same at the moment when the preceding die, after the hydraulic medium therein has been released of pressure, is retracted by its return spring 30.

Of course, in place of a straightening press with several dies it is also possible to apply a different kind of straightening device, for example, a straightening roller which revolves around the workpiece or a ring which is eccentrically mounted and should also be adjustable in a radial direction. Such a straightening roller or eccentric ring should also be designed so as to engage with the workpiece only during the time when a straightening operation is to be carried out.

The scalping machine according to the invention operates as follows: A workpiece 4 which is to be scalped or skimmed is first passed to the feed rollers 2 and 3 and is then moved by the latter through the scalping machine 1 until the front end of the workpiece engages with and actuates a limit switch 35, whereby the cylinder 20 is placed under pressure and clamping jaw 14 is moved toward the opposite jaw 12 so that the workpiece is gripped between both jaws. As soon as this occurs, carriage sections 5 and 6 are taken along by the forwardly moving workpiece. At the same time, limit switch 35 also energizes an adjustable timing relay, not shown, which, after the preset time has expired, instigates that the chambers 22 in cylinders 9 are also placed under pressure so that the pistons 8 which are connected to the other carriage section 6 will move toward the left in these cylinders until a limit switch 38 engages upon the part 6' of carriage section 6. This limit switch 38 then instigates that the pressure in chambers 22 will be released and the opposite cylinder chambers 21 will be placed under pressure so that the carriage section 6 will again move toward the right and away from carriage section 5 until one of the pistons 8 presses upon a limit switch 39 which controls the next reversal, whereupon pistons 8 are again moved toward the left. This reciprocating movement may be carried out repeatedly. It is, however, also possible to arrange the control system in such a manner that, as soon as limit switch 38 is depressed, cylinder 33 which contains piston 19 is placed under pressure so that the clamping jaws 13 and 15 on carriage section 6 are closed. Delayed by a timing relay, cylinder 20 is then relieved of pressure so that jaw 14 on carriage section 5 will be retracted and disengaged from the workpiece, whereupon the other carriage section will be taken along by the workpiece. Preferably after a certain time delay, chambers 21 of cylinders 9 are then placed under pressure so that carriage section 5 is moved toward the left and away from carriage section 6. As soon as carriage section 6 is moved by the workpiece toward the right, the straightening press 27 starts to act upon the part of the workpiece 4 between the roller supports 24 and 25 and the five press dies 26 act successively upon the workpiece. In the event that the workpiece is not properly straightened by the straightening mechanism, it is possible either to adjust the length of the stroke of the press dies 26 or to change the distance between the roller supports 24 and 25.

If the carriage section 6 should be reciprocated repeatedly relative to the carriage section 5 before jaws 13 and 15 on section 6 are engaged and jaws 12 and 14 on section 5 are released, suitable provision should be made to insure that the reciprocating movement occurs rapidly and at least more quickly than if only one reciprocating movement is carried out before that time.

If the reciprocating speed of the two carriage sections 5 and 6 is properly coordinated with the forward feeding speed of the workpiece, the two sections will reciprocate between two positions without engaging with either of the limit switches 34 or 35. If, however, the reciprocating speed of the two carriage sections is too high, the carriage section 5 will engage with limit switch 34 which then effects a reduction of the reciprocating speed of both carriage sections. If, on the other hand, the reciprocating speed is too low, the carriage section 6 will engage with limit switch 35 which then effects an increase of the reciprocating speed. Contrary to the other limit switches, switches 34 and 35 should be mounted very resiliently so as to be able to yield sufficiently when one or the other carriage section hits against them. Additional limit switches 36 and 37 may also be provided if it is desired to indicate one or both positions of clamping jaws 14 and 15.

After one workpiece 4 has been fed through the machine to such an extent that its rear end reaches the feed rollers 2, its progress is continued by feeding the next workpiece so as to push against the rear end of the former. Of course, the continued movement of each workpiece 4 may also be insured without requiring it to be pushed forwardly by the next workpiece by providing a withdrawal mechanism similar to the feeding mechanism at a suitable point behind the scalping machine 1. The rollers of such a withdrawal mechanism may also be applied upon the workpiece with such a force that they will take up the torque which is exerted upon the workpiece by the revolving cutter head. In this event, the torque does not have to be overcome by the clamping means of the two sections of the clamping carriage and they are then only required for transmitting the movement of the workpiece to the carriage sections.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a machine having a feeding mechanism for feeding a workpiece continuously toward and through the machine, at least one movable carriage comprising two sections, means for positively connecting said sections to each other and for reciprocating said sections relative to each other, means for controlling the reciprocating movements of said sections, clamping means on each of said sections for clamping the workpiece, each of said clamping means comprising at least a pair of clamping jaws, means for moving at least one of said clamping jaws of each pair relative to the other jaw, and at least one tool mounted on one of said carriage sections for machining said workpiece.

2. In a machine having a feeding mechanism for feeding a workpiece continuously toward and through the machine, at least one movable carriage comprising two sections, a plurality of cylinders on one of said sections, a plurality of pistons slidable within said cylinders and each having a piston rod thereon secured to the other section, means for alternately inserting a pressure medium into both sides of each cylinder to act upon said pistons for reciprocating said two carriage sections relative to each other, means for controlling the reciprocating movements of said sections, clamping means on each of said sections for clamping the workpiece, each of said clamping means comprising at least a pair of clamping jaws, means for moving at least one of said clamping jaws of each pair relative to the other jaw and at least one tool mounted on one of said carriage sections for machining said workpiece.

3. In a machine having a feeding mechanism for feeding a workpiece continuously toward and through the machine, at least one movable carriage comprising two sections, means for positively connecting said sections to each other and for reciprocating said sections relative to each other, means for controlling the reciprocating movements of said sections, clamping means on each of said sections for clamping the workpiece, each of said clamping means comprising at least a pair of clamping jaws, means for alternately opening and closing said clamping jaws on said two carriage sections, and at least one tool mounted on one of said sections for machining said workpiece, said tool comprising a calibrating device adapted to be operated only during the time when said clamping jaws mounted on the same carriage section as said calibrating device are opened and released from said workpiece.

4. In a machine having a feeding mechanism for feeding a workpiece continuously toward and through the machine, at least one movable carriage comprising two sections, means for positively connecting said sections to each other and for reciprocating said sections relative to each other, means for controlling the reciprocating movements of said sections, clamping means on each of said sections for clamping the workpiece, each of said clamping means comprising at least a pair of clamping jaws, means for alternately opening and closing said clamping jaws on said two carriage sections, and at least one tool mounted on one of said sections for machining said workpiece, said tool comprising a calibrating device adapted to be operated only during the time when said clamping jaws mounted on the same carriage section as said calibrating device are opened and released from said workpiece, said reciprocating means being adapted to reciprocate said carriage section supporting said tool repeatedly relative to said workpiece while said clamping jaws on the other carriage section are closed upon said workpiece.

5. In a machine having a feeding mechanism for feeding a workpiece continuously toward and through the machine, at least one movable carriage comprising two sections, means for positively connecting said sections to each other and for reciprocating said sections relative to each other, means for controlling the reciprocating movements of said sections, clamping means on each of said sections for clamping the workpiece, each of said clamping means comprising at least a pair of clamping jaws, means for alternately opening and closing said clamping jaws on said two carriage sections, and at least one tool mounted on one of said sections for machining said workpiece, said tool comprising a straightening device adapted to be operated only during the time when said clamping jaws mounted on the same carriage section as said straightening device are closed upon said workpiece.

6. In a machine having a feeding mechanism for feeding a workpiece continuously toward and through the machine, at least one movable carriage comprising two sections, means for positively connecting said sections to each other and for reciprocating said sections relative to each other, means for controlling the reciprocating movements of said section, clamping means on each of said sections for clamping the workpiece, each of said clamping means comprising at least a pair of clamping jaws, means for alternately opening and closing said clamping jaws on said two carriage sections, and at least one tool mounted on one of said sections for machining said workpiece, said tool comprising at least two workpiece supports, and a straightening device intermediate said supports and adapted to be operated only during the time when said clamping jaws mounted on the same carriage section as said straightening device are closed upon said workpiece.

7. In a machine having a feeding mechanism for feeding a workpiece continuously toward and through the machine, at least one movable carriage comprising two sections, means for positively connecting said sections to each other and for reciprocating said sections relative to each other, means for controlling the reciprocating movements of said section, clamping means on each of said sections for clamping the workpiece, each of said clamping means comprising at least a pair of clamping jaws, means for alternately opening and closing said clamping jaws on said two carriage sections, and at least one tool mounted on one of said sections for machining said workpiece, said tool comprising at least two workpiece supports, and a straightening device intermediate said supports and adapted to be operated only during the time when said clamping jaws mounted on the same carriage section as said straightening device are closed upon said workpiece, said straightening device comprising a plurality of press dies disposed within a plane extending vertically to the direction of movement of said workpiece and adapted to act consecutively upon said workpiece.

8. In a machine having a feeding mechanism for feeding a workpiece continuously toward and through the machine, at least one movable carriage comprising two sections, means for positively connecting said sections to each other and for reciprocating said sections relative to each other, means for controlling the reciprocating movements of said section, clamping means on each of said sections for clamping the workpiece, each of said clamping means comprising at least a pair of clamping jaws, means for alternately opening and closing said clamping jaws on said two carriage sections, and at least one tool mounted on one of said sections for machining said workpiece, said tool comprising at least two workpiece supports, and a straightening device intermediate said supports and adapted to be operated only during the time when said clamping jaws mounted on the same carriage section as said straightening device are closed upon said workpiece, said straightening device comprising at least one straightening roller adapted to revolve around said workpiece 9. In a machine having a feeding mechanism for feeding a workpiece continuously toward and through the machine, at least one movable carriage behind said cutter head comprising two sections, means for positively connecting said sections to each other and for reciprocating said sections relative to each other, means for controlling the reciprocating movements of said section, clamping means on each of said sections for clamping the workpiece, each of said clamping means comprising at least a pair of clamping jaws, means for alternately opening and closing said clamping jaws on said two carriage sections, and at least one tool mounted on one of said sections for machining said workpiece, said tool comprising at least two workpiece supports, means for adjusting said supports relative to each other, and a straightening device intermediate said supports and adapted to be operated only during the time when said clamping jaws mounted on the same carriage section as said straightening device are closed upon said workpiece.

10. In a machine having a feeding mechanism for feeding a workpiece continuously toward and through the machine, at least one movable carriage comprising two sections, means for positively connecting said sections to each other and for reciprocating said sections relative to each other, means for controlling the reciprocating movements of said section, clamping means on each of said sections for clamping the workpiece, each of said clamping means comprising at least a pair of clamping jaws, means for alternately opening and closing said clamping jaws on said two carriage sections, and at least one tool mounted on one of said sections for machining said workpiece, said tool comprising at least two workpiece supports each comprising guiding means adapted to engage with said workpiece means for adjusting said guiding means relative to each other and each of them in radial directions relative to said workpiece, and a straightening device intermediate said supports and adapted to be operated only during the time when said clamping jaws mounted on the same carriage section as said straightening device are closed upon said workpiece 11. In a machine having a feeding mechanism for feeding a workpiece continuously toward and through the machine, at least one movable carriage comprising two sections, means for positively connecting said sections to each other and for reciprocating said sections relative to each other, means for controlling the reciprocating movements of said section, clamping means on each of said sections for clamping the workpiece, each of said clamping means comprising at least a pair of clamping jaws, means for alternately opening and closing said clamping jaws on said two carriage sections, and at least one tool mounted on one of said sections for machining said workpiece, said tool comprising at least two workpiece supports, each comprising guide rollers adapted to engage with said workpiece, means for adjusting said guide rollers relative to each other and each of them in radial directions relative to said workpiece, and a straightening device intermediate said supports and adapted to be operated only during the time when said clamping jaws mounted on the same carriage section as said straightening device are closed upon said workpiece.

12. In a machine having a feeding mechanism for feeding a workpiece continuously toward and through the machine, at least one movable carriage comprising two sections, means for positively connecting said sections to each other and for reciprocating said sections relative to each other, means for controlling the reciprocating movements of said section, clamping means on each of said sections for clamping the workpiece, each of said clamping means comprising at least a pair of clamping jaws, means for alternately opening and closing said clamping jaws on said two carriage sections, and at least one tool mounted on one of said sections for machining said workpiece, said tool comprising at least two workpiece supports, each comprising a collet having an inner diameter adapted to increase so as to release said workpiece extending therethrough when said collet is moved in the direction of movement of said workpiece, means for closing said collets, means for adjusting said collets relative to each other, and a straightening device intermediate said supports and adapted to be operated only during the time when said clamping jaws mounted on the same carriage section as said straightening device are closed upon said workpiece.

13. In a machine having a feeding mechanism for feeding a workpiece continuously toward and through the machine, at least one movable carriage comprising two sections, means for positively connecting said sections to each other and for reciprocating said sections relative to each other, means for controlling the reciprocating movements of said sections comprising limit switches, one of said switches being associated with one of said sections and the other switch with the other section, one of said switches when actuated being adapted to increase and the other switch to decrease the speed of said reciprocating movements, clamping means on each of said sections for clamping the workpiece, each of said clamping means comprising at least a pair of clamping jaws, means for moving at least one of said clamping jaws of each pair relative to the other jaw, and at least one tool mounted on one of said carriage sections for machining said workpiece.

14. In a machine having a feeding mechanism for feeding a workpiece continuously toward and through the machine, at least one movable carriage comprising two sections, means for positively connecting said sections to each other and for reciprocating said sections relative to each other, means for controlling the reciprocating movements of said sections, clamping means on each of said sections for clamping the workpiece, each of said clamping means comprising at least a pair of clamping jaws of each pair relative to the other jaw, and at least one tool mounted on one of said carriage sections for machining said workpiece, said control means comprising a limit switch on one of said sections for controlling the movements of said sections away from each other and for controlling the alternating actuation of said clamping jaws of both sections.

15. In a machine having a feeding mechanism for feeding a workpiece continuously toward and through the machine, at least one movable carriage comprising two sections, means for positively connecting said sections to each other and for reciprocating said sections relative to each other, means for controlling the reciprocating movements of said sections comprising at least one limit switch on one of said sections for controlling the movements of said two sections away from each other, clamping means on each of said sections for clamping the workpiece, each of said clamping means comprising at least a pair of clamping jaws, means for moving at least one of said clamping jaws of each pair relative to the other jaw, and at least one tool mounted on one of said carriage sections for machining said workpiece.

16. In a machine having a feeding mechanism for feeding a workpiece continuously toward and through the machine, at least one movable carriage comprising two sections, means for positively connecting said sections to each other and for reciprocating said sections relative to each other, means for controlling the reciprocating movements of said sections, clamping means on each of said sections for clamping the workpiece, each of said clamping means comprising at least a pair of clamping jaws, means for moving at least one of said clamping jaws of each pair relative to the other jaw, at least one tool mounted on one of said carriage sections for machining said workpiece, and limit switches, each associated with one of said movable clamping jaws for indicating when said jaw is in at least one of its two positions.

References Cited by the Examiner

UNITED STATES PATENTS

| | | | |
|---|---|---|---|
| 2,234,728 | 3/41 | Gaines | 29—33.51 |
| 2,341,667 | 2/44 | Stacy | 205—4 |
| 2,394,381 | 2/46 | Hoern | 29—33.51 |
| 3,038,361 | 6/62 | Holzer | 29—33.51 |

RICHARD H. EANES, JR., *Primary Examiner.*